J. Lerch,
Harrow.
No. 106,376. Patented Aug 16, 1870.
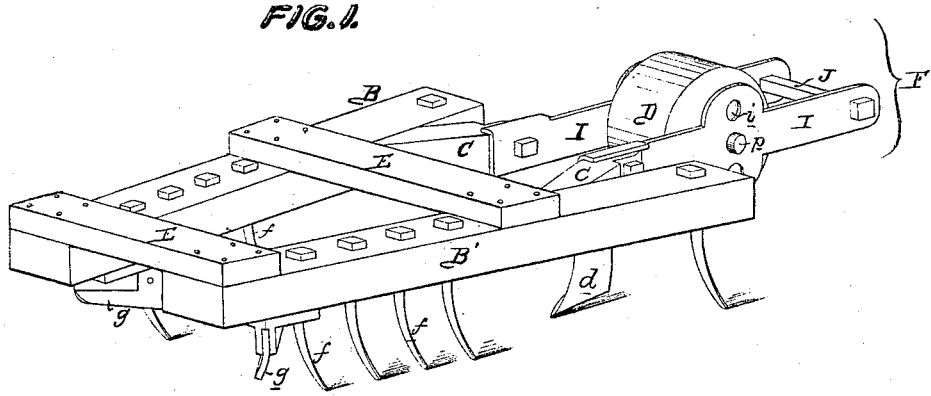
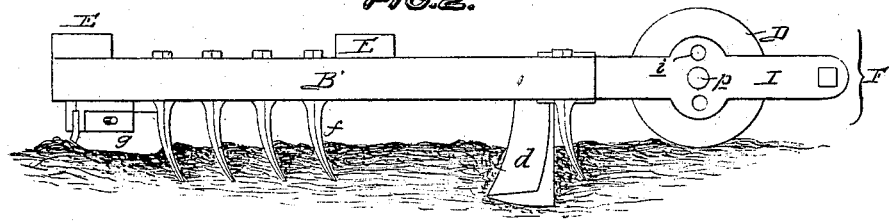
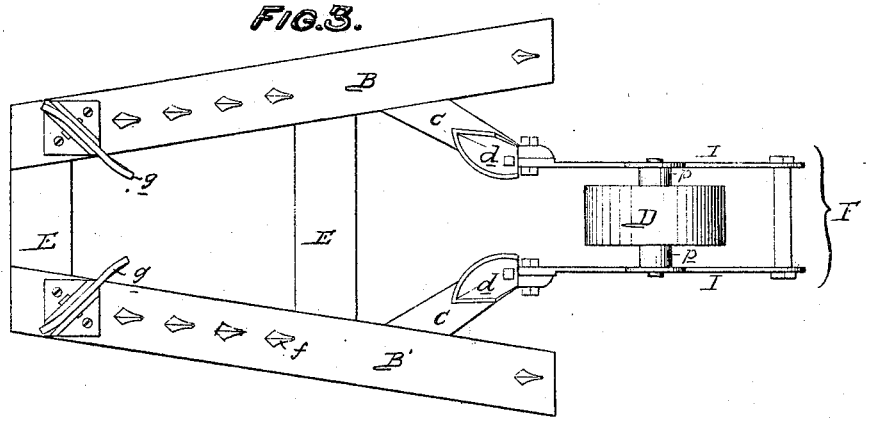
WITNESSES
Wm. A. Steel
John Parker
John Lerch
by his attr.
Howson and Son

United States Patent Office.

JOHN LERCH, OF UHLERSVILLE, PENNSYLVANIA.

Letters Patent No. 106,376, dated August 16, 1870.

IMPROVEMENT IN HARROW AND CULTIVATOR.

The Schedule referred to in these Letters Patent and making part of the same

I, JOHN LERCH, of Uhlersville, county of Northampton, State of Pennsylvania, have invented certain Improvements in Harrows and Cultivators, of which the following is a specification.

Nature and Object of the Invention.

My invention relates to improvements in the combined harrow and cultivator for which Letters Patent were granted to me on the 23d day of November, A. D. 1869; and My invention consists of a roller hung to and rendered vertically adjustable in a frame which is rigidly secured to the rear end of the frame of the implement, as described hereafter.

Description of the Accompanying Drawing.

Figure 1 is a perspective view of my combined harrow and cultivator.

Figure 2, a side elevation of the same.

Figure 3, an inverted plan view.

General Description.

The frame-work of the implement consists of two bars, B and B', (inclined in contrary directions, as seen in fig. 3,) which are connected together by cross-pieces E, and each of which has a projection, C.

To the under side of the frame, at the front end of the same, are attached inclined scrapers g, and to the frame are also secured harrow-teeth f f and cultivator-teeth d.

A frame or extension, F, within which is hung an adjustable roller, D, is rigidly secured to the rear end of the frame of the implement.

The scrapers g, harrow-teeth f, and cultivator-teeth d, are similar in construction and operation to those described in my former patent, the scrapers, however, besides being adjustable, are in the present instance curved, so as to resemble somewhat the mold-board of a plow.

The extension-frame F above referred to consists of two bars, I I, connected together by a cross-bar, J, and secured rigidly by suitable bolts to the rear of the implement.

The roller D, which is hung to this frame, is capable of vertical adjustment by means of the openings i i i arranged one above the other, and into any one of which the spindle p of the roller D may be inserted.

The implement as above arranged is intended to be drawn over an open furrow (into which potatoes, corn, or other seed has been dropped,) for the purpose of covering the said furrow, and its operation is as follows:

The adjustable scraper g will first move the loose earth, stones, brush, &c., toward and into the furrow, as described in my former patent; but these scrapers are, as before described, so shaped and curved as to be most effectual in their action while offering but a slight resistance to the forward movement of the implement.

The harrow-teeth perform in the present instance no function beyond that of steadying the implement.

The cultivator-teeth, however, for the form of which no claim is made in this application, penetrate and raise and move the soil from each side toward the center, so as to throw up a ridge of earth directly over the furrow, which ridge is flattened by the action of the roller D.

I am aware that heavy rollers have been connected to the frames of harrows and cultivators by means of hinged joints, so as to be self-adjusting to the surface of the earth.

In my invention, however, the roller is rigidly connected to the frame of the implement, so that the greater part of the weight of the latter is thrown onto the roller, thus enabling it to perform its work efficiently.

Another advantage of this rigid connection is that by adjusting the roller vertically by means of the holes i i, it can be made to raise or lower the rear end of the frame of the implement, and thus regulate the extent of penetration of the cultivator-teeth d.

Although the roll is attached rigidly to the frame, as above described, the portion F of the frame may be detached from the main frame to enable the implement to be used without the roller, when required.

Claim.

The detachable frame F, rigidly secured to the frame of a harrow or cultivator, in combination with a roller hung to the said detachable frame, all substantially as described.

In testimony whereof I have signed my name to this specification in the presence of two subscribing witnesses.

JOHN LERCH.

Witnesses:
 JOHN WHITE,
 HARRY SMITH.